United States Patent [19]

Garretson

[11] 4,308,843
[45] Jan. 5, 1982

[54] SLOW-RUN SYSTEM AND APPARATUS FOR GASEOUS FUELED INTERNAL COMBUSTION ENGINES

[75] Inventor: Keith H. Garretson, Mt. Pleasant, Iowa

[73] Assignee: Garretson Equipment Co., Inc., Mt. Pleasant, Iowa

[21] Appl. No.: 81,843

[22] Filed: Oct. 4, 1979

[51] Int. Cl.³ .............................................. F02M 21/04
[52] U.S. Cl. ..................................... 123/525; 123/527; 261/16; 137/DIG. 8
[58] Field of Search ........................ 123/527, 525, 529; 261/16; 137/DIG. 8; 251/63, 63.5; 48/184

[56] References Cited

U.S. PATENT DOCUMENTS

| | | | |
|---|---|---|---|
| 2,207,152 | 7/1940 | Huber | 251/63 |
| 2,645,570 | 7/1953 | Anderson | 261/16 |
| 2,763,285 | 9/1956 | Reeves | 251/63 |
| 2,894,829 | 7/1959 | Harrison et al. | 48/184 |
| 2,896,599 | 7/1959 | Ensign | 123/527 |
| 2,927,848 | 3/1960 | Baverstock | 48/184 |
| 2,983,592 | 5/1961 | Jones | 48/184 |
| 3,650,254 | 3/1972 | McJones | 123/527 |

*Primary Examiner*—Ira S. Lazarus
*Assistant Examiner*—Andrew M. Dolinar
*Attorney, Agent, or Firm*—Haven E. Simmons; James C. Nemmers

[57] ABSTRACT

A slow-run system for gaseous fueled internal combustion engines, including gaseous fuel conversions of liquid fuel engines for alternate operation on either fuel, employs a valve having an inlet receiving gaseous fuel from between the primary regulator and zero pressure governor and an outlet emptying into the air cleaner assembly upstream of the liquid fuel carburetor or equivalent means. The valve is actuated through a connection into the engine air intake manifold or similar passage below the throttle such that the valve opens to supply gaseous fuel to the air cleaner assembly during slow-run when manifold vacuum is high and remains open throughout substantially all of the engine's operating range.

15 Claims, 3 Drawing Figures

SLOW-RUN SYSTEM AND APPARATUS FOR GASEOUS FUELED INTERNAL COMBUSTION ENGINES

BACKGROUND OF THE INVENTION

The increasing cost and shortages of liquid fuels, especially gasoline, have turned attention to alternate operation of liquid fueled engines on gaseous fuels, such as propane, which are relatively much less expensive and more available. This is particularly true in the case of larger vehicles such as trucks, motor homes and the like which can more readily afford the extra space to carry the large pressurized tanks of gaseous fuel in liquid state. Alternate engine operation on gaseous fuels, though long known and practiced, nevertheless suffers from several longstanding problems somewhat inherent in the nature of those fuels. One of those problems is that of obtaining acceptable slow-run operation during idle and progressive off-idle conditions, especially when the throttle is suddenly opened. Current practice usually provides one system for high speed operation and another for slow-run, much as in liquid fuel carburetors, except that often the two in gaseous fuel installations are not nearly as integrated with each other as they are in liquid fuel instances.

One common slow-run system takes the gas from the main fuel line between the zero pressure governor and the main fuel inlet at the venturi and passes it through a separate line and metering valve to the engine's intake manifold or other point downstream of the throttle. The high intake manifold vacuum during slow-run conditions activates the zero pressure governor to supply gas to the intake manifold, the latter supply gradually tapering off as the main fuel system comes into operation as engine speed increases. The chief trouble with this arrangement is that it tends to produce a flat spot when the throttle is suddenly opened. The consequent sharp drop in manifold vacuum starves the slow-run system by allowing the zero pressure governor to close down until engine speed is sufficient to reactivate it by virtue of the demand communicated to it by the main fuel system and by the partial recovery of vacuum in the intake manifold. In addition, in part owing to the restriction furnished by the metering valve in the slow-run line and in part depending upon how "sensitively" set the zero pressure governor is, sudden throttle opening may initially also pull air in from the main fuel inlet and thence into the slow-run system rather than activating the zero pressure governor to supply fuel to the slow-run and the main systems, thus adding to the severity and duration of the flat spot. In short, in the foregoing system operation of the zero pressure governor is disturbed, with the foregoing adverse consequences, when progressing from idle to off-idle conditions.

Another well known slow-run system eliminates the separate line to the intake manifold and instead sets the zero pressure governor so that it remains open sufficiently to supply fuel for slow-run purposes through the main fuel line to the venturi. In effect, during slow-run conditions the zero pressure governor acts as a pressure regulator rather than as a demand regulator. This arrangement is sometimes referred to as a "leaker" system inasmuch as the zero pressure governor continuously "leaks" gas into the main fuel line during slow-run. The "leaker" system also has its own deficiencies. One of these is that it tends to impose a back pressure upon the gas through the main fuel inlet at the venturi which in turn inverts the diaphragm of the zero pressure governor and thus upsets idle and off-idle conditions. This may also be aggravated by the metering restriction interposed in the main line to adjust the slow-run engine speed. Hence, if the throttle is suddenly opened, there can be an appreciable lag before the zero pressure governor can "reconvert" itself from "pressure" to demand type operation and supply sufficient fuel to the venturi. In short, the "leaker" system also disturbs proper operation of the zero pressure governor.

Still another system brings the slow-run gas into the liquid fuel carburetor below the throttle through a line incorporating a transverse rotary valve linked to the throttle such that the valve opens to supply more gas whenever the throttle opens. This functions fairly well and progressively but is difficult to incorporate into the liquid fuel carburetor besides requiring a considerable number of rather expensive, precision parts as well as a mechanical linkage. Other approaches more completely integrate the main and slow-run systems. One employs a diaphragm governed valve which controls a small variable venturi for slow-run and separate fixed large venturi for high speed operation, and another uses a diaphragm controlled valve in conjunction with a fuel valve which together meter both air and fuel throughout the engine's speed range including slow-run. Examples of these two latter approaches are found in U.S. Pat. Nos. 2,937,848 and 2,983,592 from which it will be readily seen that both are fairly intricate and thus expensive and elaborate to manufacture.

Accordingly, the primary object of the present invention is provide a slow-run system for gaseous fuel operation of an internal combustion engine which avoids the foregoing problems and deficiencies on the one hand but which on the other is simple in structure, inexpensive to produce, efficient in operation, and readily incorporated in a gaseous fueled engine or in a conversion of a liquid fueled engine for alternate gaseous fuel operation.

SUMMARY OF THE INVENTION

The foregoing problems, deficiencies and complexities are avoided by the present invention which draws the fuel for slow-run not from the zero pressure governor, but rather from the primary regulator which, unlike the former, provides gas at a relatively constant pressure regardless of the demands of the engine. That gas is then lead from the primary regulator through an entirely separate line not into the carburetor or similar device or into the intake manifold, but rather into the engine's air intake upstream of all the latter. In practice, this is done simply by discharging the slow-run gas into the air cleaner assembly. A simple valve is interposed in a line from the primary regulator to the air cleaner, which valve is controlled by engine manifold vacuum. During most of the time when air pressure in the intake manifold is below atmospheric, that is, during periods of low as well as high manifold vacuum, the valve is held open so that gas is supplied to the air cleaner and thence to the engine. This continues even after the engine speed is sufficient to bring the main fuel system into operation, and indeed the valve will fully close, if at all, only under full load conditions. For idle adjustment the valve also incluudes a metering device controlling the gas flow to the air cleaner.

Accordingly, the problems endemic to taking the slow-run gas from the zero pressure governor and introducing it into the intake manifold or other point below the throttle, which impedes off-idle progression because it upsets operation of the zero pressure governor, are neatly and simply avoided by in effect shunting the zero pressure governor entirely during idle and initial off-idle operation. Instead, the latter are sustained by an even flow of gas under constant pressure from the primary regulator into the air cleaner or other point upstream, and hence free, of any influence of carburetor or intake manifold induced variations. As is readily apparent, the parts required are few and rudimentary and can be easily incorporated into new or existing systems or conversions for gaseous fuel, or alternate gaseous-liquid fuel, operation. No modifications are usually necessary to the primary regulator since the gas is taken off from the test port normally provided on typical, commercially produced regulator units between their primary and demand portions. Other features and advantages of the present invention will appear from the more detailed description which follows and the drawings.

DETAILED DESCRIPTION OF THE PREFERRED EMBODIMENT

Figure 1:
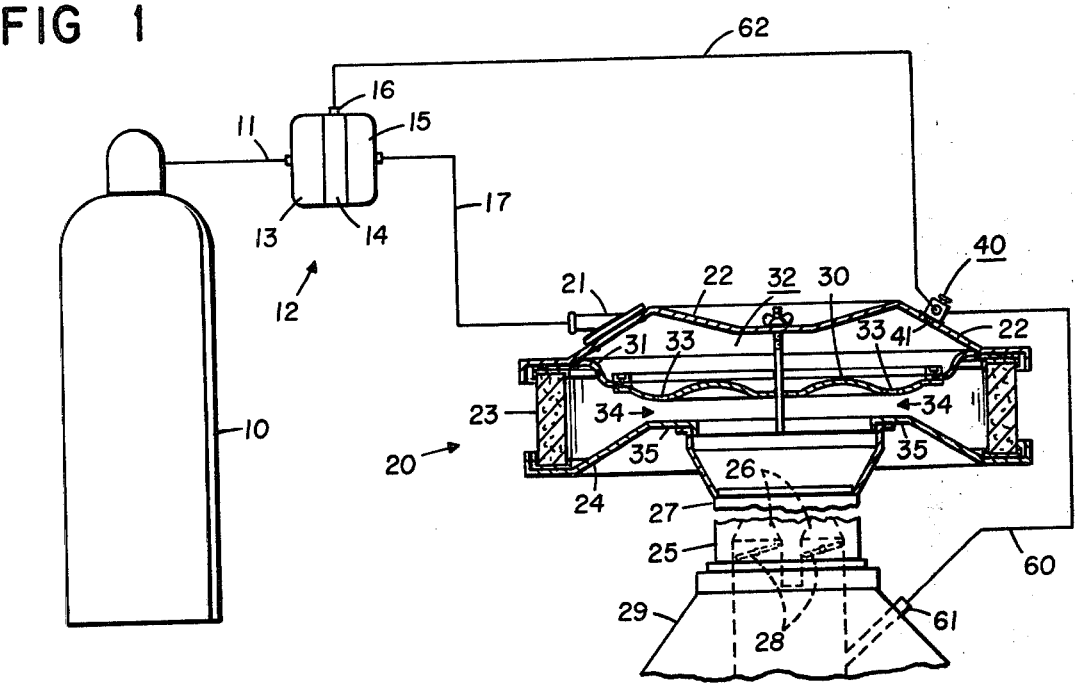
FIG. 1 is a somewhat schematic illustration of the present invention incorporated into an internal combustion engine converted for alternate gaseous or liquid fuel operation.
Figure 2:
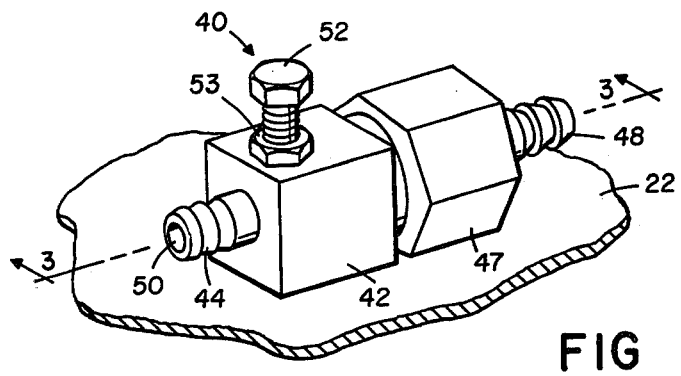
FIG. 2 is an enlarged, three-quarter view of the control valve employed in FIG. 1.
Figure 3:
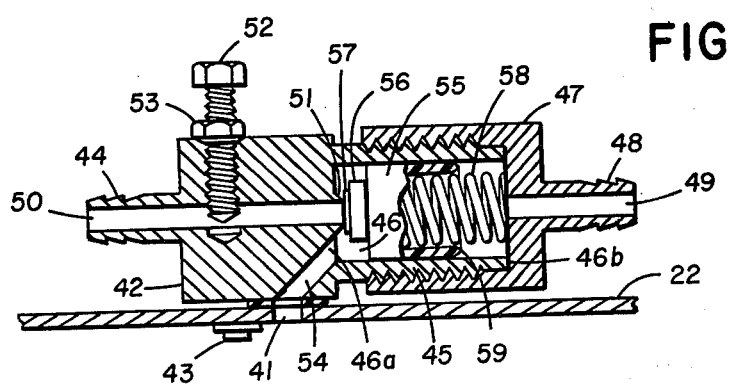
FIG. 3 is a sectional view taken along the line 3—3 of FIG. 2.

In FIG. 1, 10 denotes a typical pressurized tank of gaseous fuel in liquid state whose outlet is connected by a hose 11 to the inlet of a typical primary regulator-zero pressure governor unit 12 of a kind well-known in the art. The latter includes a primary section 13 from which fuel is lead through a water jacketed vaporizer 14 and into the zero pressure section 15, the outlet of the vaporizer 14 including a normally closed test port 16 between the sections 13 and 15. The port 16 is disposed in effect downstream of the valve in the primary section 13 and upstream of the valve in the zero pressure section 15 so that gas is present at the port 16 at the typical pressure, say, 4-6 psi, at which it is received from the primary section 13 and discharged to the zero pressure section 15.

A hose 17 connects the outlet of the zero pressure section 15 to an air cleaner assembly 20 at an inlet fitting 21 opening through its cover 22. An annular air filter element 23 is sandwiched between the cover 22 and an annular adapater 24, and the entire assembly 20 in turn sits atop a typical liquid fuel carburetor 25 having air intake passages and venturis 26 leading from the carburetor air horn 27 down past the throttles 28 into the engine's intake manifold 29. Within the air cleaner assembly 20 may be disposed any suitable gaseous main fuel system supplied from the inlet 21. Preferably, however, the assemby 20 is of the nature of that forming the subject matter of a copending application for Letters Patent by the present inventor. That system includes a diaphragm plate 30 suspended by an annular gasket 31 to form with the cover 22 a chamber 32 into which the inlet 21 empties. The diaphragm plate 30 includes a ring of outlet ports 33 which admit fuel from the chamber 32 into an annular venturi 34 formed by the diaphragm plate 30 at the ports 33 and the adapter neck 35. The diaphragm plate 30 is reciprocally movable, being disposed toward the adapter neck 35 to form the venturi 34 during gaseous fuel operation, and automatically disposed away from the neck 35 to form an unconstricted air intake passage to the air horn 27 during liquid fuel operation.

The control valve 40 incorporated in the present invention is preferably mounted on the air cleaner cover 22, for instance opposite the main gas inlet 21, and communicates with the carburetor air horn 27 through an inlet 41 through the cover 22 and, in the particular installation illustrated, the chamber 32 and outlet ports 33. The valve 40 includes a rectangular body 42 secured to the cover 22 over the inlet 41 by screws 43. One end of the body 42 is provided with an integrally formed, barbed hose nipple 44 while its opposite end 45 is exteriorly cylindrically machined and threaded. The latter end is also axially bored to provide a valve chamber 46 axially aligned with the nipple 44 and having an inner end wall 46a. The chamber 46 is closed by a hexagonal end cap 47 threaded on the body end 45 which forms an outer chamber end wall 46b. The outer end of the cap 47 is also provided with a barbed hose nipple 48 axially aligned with and bored through the chamber end wall 46b to form a valve control passage 49. The hose nipple 44 is likewise axially bored to provide a valve inlet passage 50 opening axially through the chamber end wall 46a at an upset valve orifice 51. An idle metering screw 52, provided with a lock-nut 53, is threaded into the top of valve body 42 and variably intersects the inlet passage 50. An outlet passage 54 opens through the chamber end wall 46a adjacent the orifice 51 and angles therefrom through the valve body 42 to communicate with the cover inlet 41.

Within the chamber 46 is disposed a freely slidable, cylindrical plunger 55, shouldered at 56, and fitted at the shouldered end with an inset disc 57 of seal material which seats on the orifice 51 to close off the inlet passage 50 from the chamber 46 and thus also from the outlet passage 54. The plunger 55 is preferably hollow, its other end opening toward the chamber end wall 46b, and receives a light coil spring 58 bearing against the end wall 46b and surrounding the inner end of the control passage 49. The spring 58 normally biases the plunger 55 against the orifice 51, the opposite annular end of the plunger 55 being formed with an apex shaped sealing edge 59 which, when the plunger 55 is withdrawn against the spring 58, seats against the chamber end wall 46b to close off the control passage 49 from the chamber 46. Finally, a hose 60 connects the nipple 48 with the interior of the engine's intake manifold 29 at 61, and a hose 62 connects the nipple 44 with the test port 16 of the regulator-governor unit 12.

Accordingly, when the engine is at idle speed, which is adjusted by the metering screw 52, the high vacuum in the intake manifold 29 acts through the hose 60 and the control passage 49 to withdraw the plunger 55 against its spring 58 so that its sealing edge 59 seats against the chamber end wall 46b. The plunger 55 thus opens communication between the valve inlet and outlet passages 50 and 54 through the chamber 46 at the end wall 46a. Gas under pressure from the primary section 13 then flows through the hose 62, the passages 50 and 54, and the cover inlet 41 into the air cleaner assembly 20, and thence through the carburetor 25 into the engine manifold 29 for slow-run operation. The spring 58 is light enough so that even when manifold vacuum drops sharply upon sudden opening of the throttles 28, the plunger 55 remains seated against the chamber end wall 46b, whence gas continues to flow uninterruptedly through the chamber 46 to the air cleaner assembly 20. Only under wide-open throttle and full load conditions might the plunger 55 perhaps close against the orifice 51. Hence there is no interruption in gas flow at idle or off-idle conditions, nor any disturbance of the zero pressure section 15 which functions independently through the hose 17 to provide fuel to the main gas inlet 21 according to the demands of the main fuel system. Any leakage of gas past the plunger 55 and into the control passage 49 while the engine is running is harmless since it simply passes into the intake manifold 29 and is consumed by the engine.

The valve body 42 and end cap 47 may be made from any suitable material, such as aluminum, and the plunger 55 from a light weight plastic. While the valve 40 is shown mounted to the air cleaner assembly 20, it could, of course, be mounted separately elsewhere in which case an additional hose and fittings would be required to connect the cover inlet 41 and valve outlet passage 54. The valve cap 47 may also incorporate the typical vacuum switch (not shown) controlling a solenoid operated valve which is sometimes required to prevent any gas from flowing through the hoses 17 and 62 into the engine when the ignition is "on " but the engine is not running. In the case of the valve 40, though as noted the spring 58 is light enough to keep the plunger 55 seated against the chamber end wall 46b while the engine is running, yet it must be strong enough to keep the plunger 55 seated against the orifice 51 against the pressure of the primary section 13, say 4-6 psi, when the engine is not running but is being cranked by the starter, at which time the aforementioned vacuum controlled solenoid valve is open and the customary engine priming system (not shown) is operating. The latter system is wired through the starter and pulses the zero pressure diaphragm to supply fuel through the main hose 17 until the starter is deenergized when the engine fires. A typical standard for a valve of this nature operating against the pressure of a primary regulator is that it resist pressures up to 2½ times that of the primary regulator. This is readily accomplished, owing to the small area of the orifice 51, so that the spring 58 can be both strong enough to meet the standard and yet light enough to allow the valve 40 to open at a manifold vacuum as low as, say, -1.0 inches of mercury once the engine fires. Indeed, any other means responsive to engine operation could be used to open and close the valve 40, manifold vacuum being preferably employed because it is the simplest and most readily available means for this purpose.

In any event, though the present invention has been described in terms of a particular embodiment, being the best mode known of carrying out the invention, it is not limited to that embodiment alone. Instead, the following claims are to be read as encompassing all adaptions and modifications of the invention falling within its spirit and scope.

I claim:

1. In a system for operating an internal combustion engine on gaseous fuel, the system including gaseous fuel supply means, primary regulator means, zero pressure governor means and an arrangement for slow-run of the engine, the engine including an engine air supply passage having throttle means therein for varying the supply of mixed gaseous fuel and air to the engine, the primary regulator supplying gaseous fuel to the zero pressure governor at a pressure above that in the engine air supply passage and the zero pressure governor supplying gaseous fuel through first communicating means to the engine air supply passage upstream of said throttle means, wherein the slow-run arrangement comprises: valve means having an inlet and an outlet, the valve inlet receiving gaseous fuel at said pressure from the primary regulator through second communicating means, and the engine air supply passage above said throttle means receiving gaseous fuel from the valve outlet through third communicating means independent of the zero pressure governor and the first communicating means effective to prevent gaseous fuel pressure in the third communicating means from influencing operation of the zero pressure governor; control means responsive to operation of the engine effective to close the valve means when the engine is not operating and to open the valve means for supply therefrom of gaseous fuel to said air supply passage when the engine is operating; and adjusting means for varying the quantity of gaseous fuel delivered through the third communicating means to said air supply passage when the valve means is open as aforesaid.

2. The system of claim 1 wherein the valve means includes the control means, the control means being responsive to air pressure in said air supply passage downstream of said throttle means, the control means opening the valve means as aforesaid during at least a portion of the time when said air pressure is less than atmospheric.

3. The system of claim 2 including an engine air intake assembly constituting a portion of said air supply passage upstream of said throttle means; and wherein the outlet of said valve means communicates with said intake assembly.

4. The system of claim 3 wherein said valve means is mounted on said air intake assembly; and wherein said adjusting means is incorporated into said valve means.

5. The system of claim 1 wherein the engine includes means for alternate operation of the same on liquid fuel, said liquid fuel operating means including said throttle means and a portion of said air supply passage; and including an engine air intake assembly constituting another portion of said air supply passage upstream of said liquid fuel operating means; and wherein said valve outlet communicates with said air intake assembly through the third communicating means.

6. The system of claim 5 wherein said valve means is carried by said intake assembly; and wherein said adjusting means constitutes a portion of said valve means.

7. The system of any one of claims 1 through 6 wherein said valve means comprises a valve body including an inner chamber having opposite first and second ends, said valve inlet and outlet comprising separate passages in said valve body opening into the chamber adjacent each other at a first location therein; and wherein said valve control means includes a control passage in said valve body opening into the chamber at a second location therein, said control passage communicating with said air supply passage downstream of said throttle means, a valve member disposed in said chamber for movement between a first position at said first location closing off communication between said valve inlet and outlet passages and opening communication between said chamber and said control passage at said second location, and to a second position opening communication between said valve inlet and outlet passages at first location and closing off communication between said chamber and said control passage at second location, and means biasing said valve member to its first position.

8. The system of claim 7 wherein said adjusting means is carried by the valve body and disposed in said inlet passage.

9. Apparatus for use in a gaseous fuel conversion of a liquid fuel internal combustion engine for operation alternately on liquid or gaseous fuel in which the conversion includes gaseous fuel primary and secondary regulators and in which the engine includes an engine air intake assembly having means for supplying a mixture of air and liquid fuel to the engine and throttle means for varying the supply of mixed air and fuel to the engine, the primary regulator supplying gaseous fuel to the secondary regulator at a pressure above that in the engine air intake assembly and the secondary regulator supplying gaseous fuel through a first passage to the engine air intake assembly upstream of said throttle means, said apparatus comprising: a valve assembly including gaseous fuel inlet and outlet passages having respective inner and outer ends, the inner ends of the inlet and outlet passages communicating with each other, and a valve control passage having inner and outer ends, the outer end of the valve inlet passage being adapted for connection to a primary regulator of the foregoing nature to receive gaseous fuel therefrom at said pressure through a second passage for supply of gaseous fuel to the valve inlet passage, the outer end of the valve outlet passage being adapted for connection through a third passage to an engine air intake assembly of the foregoing nature for supply of gaseous fuel thereto, the third passage being isolated from the secondary regulator and the first passage in order to avoid gaseous fuel pressure in the third passage affecting delivery of gaseous fuel by the secondary regulator to the first passage, and the outer end of the valve control passage being adapted for connection to an engine air intake assembly of the foregoing nature downstream of said throttle means thereof, the valve assembly including valve operating means movable between a first position closing off communication between the inner ends of said valve inlet and outlet passages and a second position opening communication between said valve passages, means biasing the valve operating means to its first position, said operating means being responsive to below atmospheric pressure in said valve control passage to move the valve operating means against the biasing means to its second position, and means to adjust the cross-sectional area of one of said valve inlet and outlet passages at a location therealong.

10. The valve assembly of claim 9 including means for mounting the valve assembly to an engine air intake assembly of the aforesaid nature.

11. The valve assembly of claim 9 in combination with an engine air intake assembly of the foregoing nature, the air intake assembly including an outer wall having an aperture communicating therethrough with the outer end of said valve outlet passage.

12. The combination of claim 11 wherein the valve assembly is mounted upon the exterior of the said air intake assembly wall.

13. The valve assembly of any one of claims 9 through 12 including a valve body having an inner cylindrical chamber provided with first and second end walls, the inner ends of said valve inlet and outlet passages opening into the chamber through its first end wall with one of said passages disposed axially of said chamber, the inner end of said valve control passage opening axially into the chamber through its second end wall, a cylindrical plunger slidably movable in said chamber between first and second positions constituting said first and second positions of said valve operating means, one end of the plunger carrying sealing means for sealingly engaging the inner end of one of said inlet and outlet passages at said chamber first end wall when the plunger is in its first position, said biasing means being interposed between said plunger and said chamber second end wall, the other end of said plunger sealingly engaging said chamber second end wall to substantially close off communication between said chamber and the inner end of said valve control passage when the plunger is in its second position.

14. The valve assembly of claim 13 wherein the plunger is provided with a cylindrical interior opening through said other plunger end, and including a compressible helical spring disposed in said plunger interior and engaging the second chamber end wall radially outward of the inner end of the valve control passage, the spring constituting said biasing means.

15. The valve assembly of claim 14 wherein said adjusting means is carried by the valve body and intercepts said inlet passage between its inner and outer ends.

* * * * *